Feb. 11, 1941.                G. W. EMRICK                2,231,465
                            TAPPING ATTACHMENT
                           Filed July 11, 1939         2 Sheets-Sheet 1

INVENTOR
GEORGE W. EMRICK
BY
Howard E. Thompson
ATTORNEY

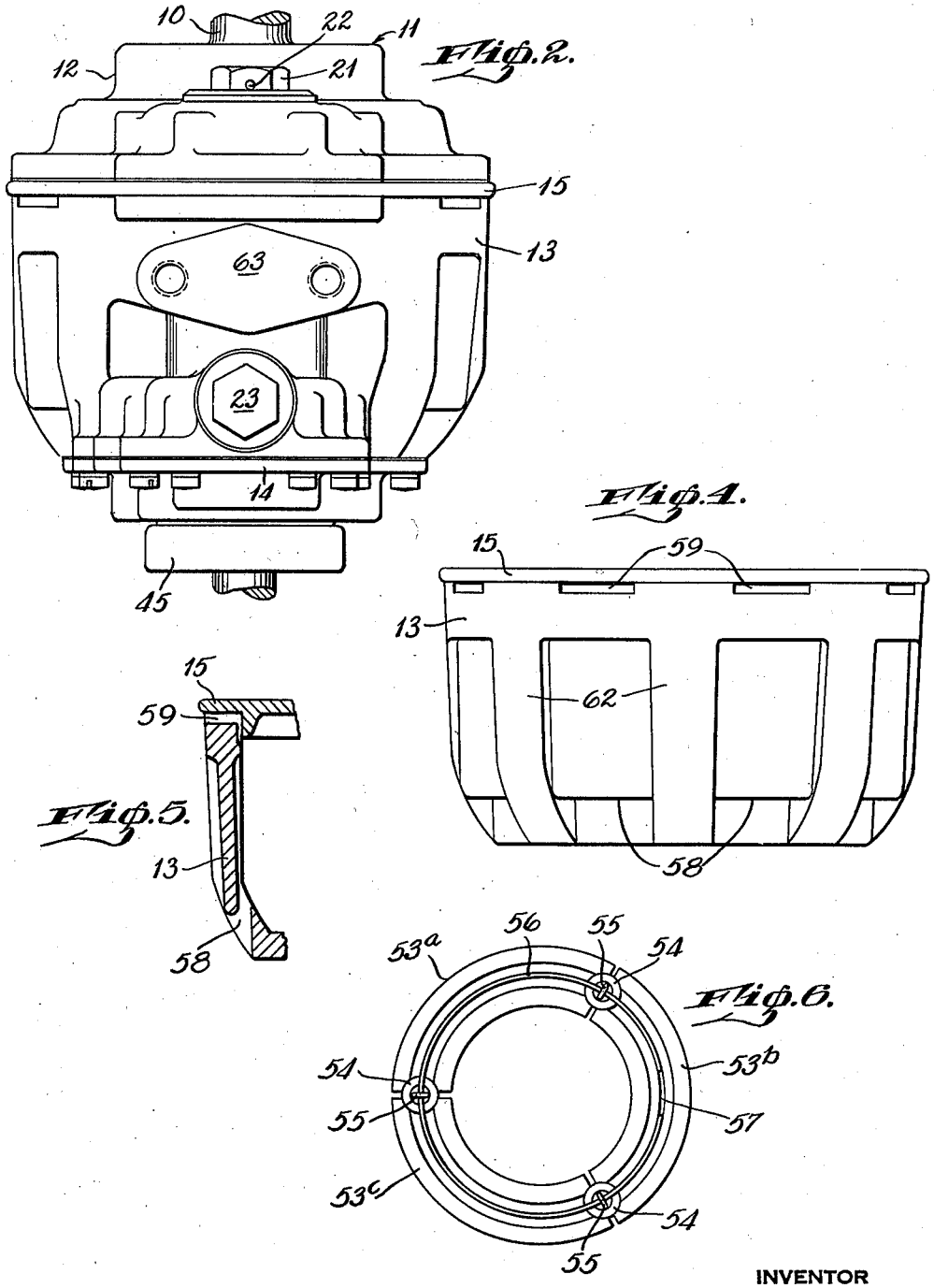

Patented Feb. 11, 1941

2,231,465

UNITED STATES PATENT OFFICE 2,231,465

TAPPING ATTACHMENT

George W. Emrick, Brooklyn, N. Y.

Application July 11, 1939, Serial No. 283,760

13 Claims. (Cl. 74—377)

This invention relates to tapping attachments of the type and kind employing forward and reverse drive of the tool; and the object of the invention is to provide an attachment of the class described comprising a plurality of casing or frame parts to form within the attachment housing as a whole, three chambers, two of which constitute gear chambers and the third a clutch chamber interposed between the gear chambers and sealed therefrom; a still further object being to provide means for circulating air through the clutch chamber to provide a cooling effect upon the clutch elements and to circulate cooling air through the elements, thus permitting the operation of the attachment at very high speeds; a further object being to provide an attachment of the character described wherein the clutch element employed involves forward and reverse driving rings, each having doubled tapered walls mounted for automatic seating in a double grooved or corrugated drive shell to provide a very compact arrangement of parts while at the same time adapting the attachment for operation with relatively large tapping tools at the high speed operations; and with these and other objects in view, the invention consists in a device or attachment of the class and for the purpose specified, which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:

Fig. 2 is a side view of the attachment looking in the direction of the arrow 2, Fig. 3.

Fig. 4 is a detail view of one part of the casing or housing of the attachment.

Fig. 5 is a partial section on the line 5—5 of Fig. 3, and

Fig. 6 is a plan view of one of the clutch rings employed, detached.

Figure 1:
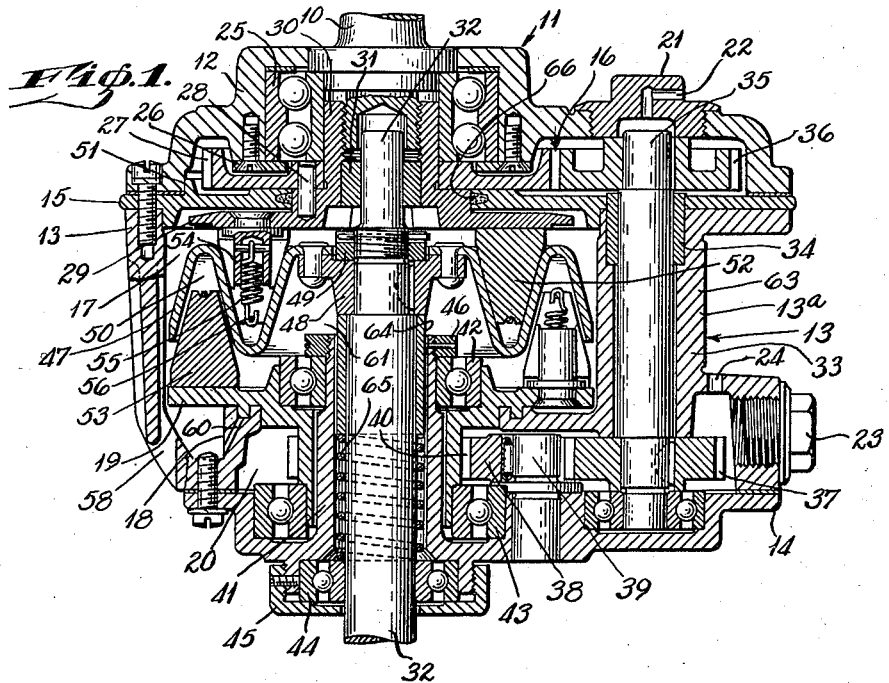
Fig. 1 is a sectional view through my improved attachment, the section being on the broken line 1—1 of Fig. 3.
Figure 3:
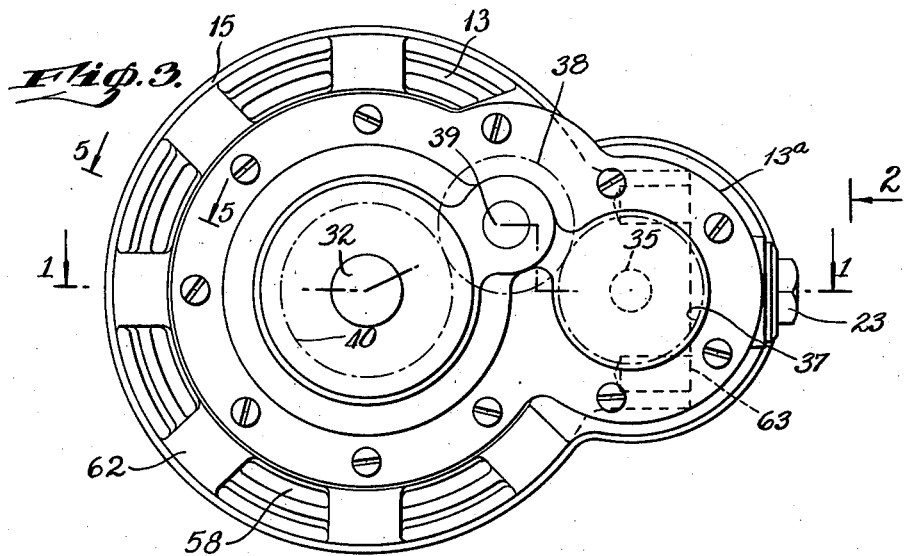
Fig. 3 is a bottom plan view of the attachment.

In the drawings, 10 represents the drive spindle which protrudes beyond the casing or housing 11 for attachment to a suitable machine. The casing or housing 11 is formed of a top cover part 12, a main casing part 13, a bottom cover part or casing 14 and a partitioning plate part 15. The latter subdivides an upper gear chamber 16 from the clutch chamber 17, whereas an extension 18 on the main casing part 13 cooperates with a reverse drive clutch supporting plate 19 in forming another gear chamber 20 which is subdivided and sealed from the chamber 17. The purpose of this construction is to prevent lubricant, preferably in the form of a grease, which is placed in each of the chambers 16, 20, from entering the chamber 17. The grease is introduced into the chamber 16 through a detachable plug 21 having a vent 22 therein, whereas grease is admitted into the chamber 20 through a plug 23 mounted in an extension 13a of the casing, a vent 24 being also provided to the chamber 20, as clearly seen in Fig. 1.

A ball bearing 25 is arranged in the part 12, it being held therein by a retaining plate 26. Freely rotatable in the bearing 25 is a drive gear 27 keyed as seen at 28 to a clutch supporting plate 29 which is provided with a sleeve portion 30 into which the spindle 10 is threaded. A bushing 31 is arranged in the sleeve 30 to form a guide for the upper reduced end portion of a driven spindle 32 as will be apparent.

The extension 13a has a cylindrical portion 33 in the upper portion of which is arranged a bronze bushing 34 to seal and guide a supplemental shaft 35 therein, a gear 36 being secured to the upper end of the shaft 35, and this gear meshes with the gear 27. A gear 37 is secured to the lower end of the shaft 35 and meshes with a pinion 38 arranged upon a stub shaft 39 in the case part 14. The pinion 38 also meshes with a gear 40 which is freely rotatable upon an upwardly extending sleeve portion 41 on the case part 14 and forms, in the construction shown, part of the clutch supporting plate 19. The plate 19 has a ball bearing mounting 42 on the inner end of the sleeve 41, another ball bearing mounting 43 being provided for the plate 19 in the casing part 14. The shaft 32 has a ball bearing mounting as at 44 in the lower portion of the case part 14, the bearing being held in place by a cap 45.

It will appear that the extension 18 of the casing 13 has a tongue and groove connection with the clutch plate 19 in forming the seal between the chamber 20 and the chamber 17.

A nut 46 is arranged upon the inner end of the sleeve 41 to retain the bearing 42 in position.

A double circumferentially grooved driving clutch shell 47 is arranged within the chamber 17, being supported centrally on a sleeve hub portion 48 to which it is secured, the latter being keyed to the shaft 32 and held against displacement thereon by a nut 49. In mentioning the double grooved shell, one might say that the shell is of corrugated cross sectional form to provide a downwardly opening annular channel 50 at the periphery of the shell and an upwardly directed channel 51 inwardly of said first named channel. Both channels are of V-shaped cross sectional form to provide outwardly diverging surfaces in connection with which clutch rings of corresponding cross sectional form are adapted to seat. The upper or forward drive clutch ring is shown at 52, whereas the lower or reverse drive ring is shown at 53. Except for the difference in diameter, these two rings are of the same structural arrangement and are only briefly described as they are made the subject matter of a companion application, directed to the clutch mechanism per se, filed July 11, 1939 and bearing Serial No. 283,761.

One of the rings, for example the ring 53 is shown as a detached plan view in Fig. 6 of the drawings, from which figure it will be noted that the ring is divided into three sectional parts, 53a, 53b and 53c. Adjacent ends of the parts envelope sleeve-like studs 54 secured to the plate 19 and within the base of which are secured coil springs 55, the upper ends of which are hooked over a split ring 56 seating in an upper grooved portion 57 on the ring 53 of the separate parts or sections thereof. As each clutch ring is of the same construction, the brief description as applied to one will be readable on both, the same reference numerals being applied.

The purpose of employing independent sections in the clutch rings is to provide automatic seating of the rings in the respective clutch sockets to compensate for any slight variations due to temperature changes and the like. It is preferred that the clutch rings be composed of asbestos brake lining material which operates dry. From this standpoint it is desirable to seal the chamber 17 from both the chambers 16 and 20.

Bearing in mind that the tapping attachment is designed for heavy duty and high speed work, I have also provided means for air-cooling the clutch mechanism by the circulation of air through the chamber 17. This is accomplished by providing admission ports 58 opening through the lower portion of the main casing part 13 and exhausting through laterally extending vents 59 arranged between adjacent surfaces of the plate 15 and the casing 13 as will appear on a consideration of Figs. 4 and 5 of the drawings. Further bearing in mind the high speed at which the device normally operates, it is also preferred that vent passages 60 be provided in the extension 18 to lead out excess grease which may leak by the seal. It will be apparent that the vents 60 will conduct the grease away from the rotating parts which would tend to throw the grease onto the walls of the clutch chamber.

It will appear from a consideration of Fig. 4 of the drawings that the exterior of the casing part 13 is provided with circumferentially spaced ribs 62 to give the required strength thereto, while at the same time reducing the weight of the attachment as a whole. The extended side 13a of the casing is provided with a double threaded apertured pad 63 for the attachment of the usual stop or check rod, not shown, for preventing the rotation of the attachment.

Arranged upon the shaft 32 within the sleeve 41 is a bushing 64 which actually forms an extension of the hub portion 48. The purpose of this bushing is to provide a seat for a spring 65 which also seats upon the bearing 44 and normally serves to support the clutch shell 47 in raised position or in engagement with the clutch 52, while at the same time permitting downward movement of the driven shell 32 against the action of said spring in moving the shell 47 into engagement with the clutch 53 in the reverse drive of the attachment; that is to say, in feeding the tool out of the workpiece.

In the operation of the attachment, it will be understood that in the forward drive of the tool, the clutch 52 is in engagement with the shell 47, and thus the shaft 32 is driven directly from the spindle 10. However, in the reverse drive, the shell 47 is moved out of engagement with the clutch 52 and brought into engagement with the clutch 53 and the tool will be driven under the reverse direction through the gears 27, 36, 37, 38 and 40. The latter rotate the clutch plate 19 to which the clutch 53 is secured. By operating the reverse drive in the groove 50 of the shell 47 having the greatest diameter, the greatest power is produced which is desirable in the high speed withdrawal of the tool from the workpiece.

With an attachment of the character described, the working parts thereof which require lubrication may be maintained properly lubricated at all times through the convenient means employed for introducing the lubricant into the respective chambers 16 and 20, while at the same time keeping the clutch mechanism free of the lubricant, thus producing the most efficient operation, especially bearing in mind the air cooling effect which is made possible through the circulating passages provided at circumferentially spaced intervals throughout the casing in the manner most clearly illustrated in Figs. 4 and 5 of the drawings.

It will also appear that by constructing the casing of the several parts employed, independent accessibility is provided to the separate chambers 16, 17 and 20.

A packing gland or the like 66 is disposed between the casing plate 15 and the forward clutch drive plate 29 or the hub portion thereof, as seen in Fig. 1 of the drawings, to insure a lubricating seal between the chambers 16 and 17. It will also be noted that gaskets are included between the casing parts 12 and 15 as well as between the parts 13 and 14 in the conventional manner, as indicated in the drawings, to provide proper seating between the respective parts.

Having fully described my invention, what I claim as new and desire to secure by Letters Patent, is:

1. A tapping attachment of the class described comprising a housing consisting of a plurality of detachably coupled parts subdividing the attachment into upper and lower gear chambers and an intermediate clutch chamber, and means sealing the first named chambers from the last named chamber to prevent lubricant inserted in the first named chambers from entering the last mentioned chamber to maintain the clutch mechanism dry.

2. A tapping attachment of the class described comprising a housing consisting of a plurality of detachably coupled parts subdividing the attachment into upper and lower gear chambers and an intermediate clutch chamber, means sealing the first named chambers from the last named chamber to prevent lubricant inserted in the first named chambers from entering the last mentioned chamber to maintain the clutch mechanism dry, and means for circulating air through the clutch chamber for cooling the clutch mechanism operating therein.

3. A tapping attachment of the class described comprising a housing consisting of a plurality of detachably coupled parts subdividing the attachment into upper and lower gear chambers and an intermediate clutch chamber, means sealing the first named chambers from the last named chamber to prevent lubricant inserted in the first named chambers from entering the last mentioned chamber to maintain the clutch mechanism dry, means for circulating air through the clutch member for cooling the clutch mechanism operating therein, and means communicating with the seal of said lower gear casing for by-passing grease, leaking past said seal, in a direction away from said clutch chamber.

4. A tapping attachment of the class described comprising a housing formed from a main casing part having a top detachable part and a bottom detachable part, a plate portion interposed between the main and top parts forming a sealed gear chamber within the top case part, means comprising a reverse drive clutch plate forming a sealed gear chamber within the lower end portion of the main case part and said bottom case part, said main casing part having a clutch chamber intermediate said gear chambers, a drive spindle mounted in the upper case part, a driven tool supporting shaft mounted in the lower case part, and a forward and reverse drive clutch mechanism in said clutch chamber controlling forward and reverse drive of said driven shaft.

5. A tapping attachment of the class described comprising a housing formed from a main casing part having a top detachable part and a bottom detachable part, a plate portion interposed between the main and top parts forming a sealed gear chamber within the top case part, means comprising a reverse drive clutch plate forming a sealed gear chamber within the lower end portion of the main case part and said bottom case part, said main casing part having a clutch chamber intermediate said gear chambers, a drive spindle mounted in the upper case part, a forward and reverse drive clutch mechanism in said clutch chamber controlling forward and reverse drive of said driven shaft, means admitting air into the lower portion of the clutch chamber, and means for discharging the same at the upper portion of said chamber.

6. The combination with a tapping attachment of the class described, having a forward and reverse drive clutch mechanism with means placing a drive spindle in operative engagement with the reverse drive of said mechanism and the reverse drive of a driven spindle, of means subdividing the attachment into upper and lower gear compartments sealed from an intermediate clutch compartment to provide dry operation of the clutch mechanism employed, and means for circulating air through the clutch compartment in cooling the clutch mechanism arranged therein.

7. The combination with a tapping attachment of the class described having a forward and reverse drive clutch mechanism with means placing a drive spindle in operative engagement with the reverse drive of said mechanism and the reverse drive of a driven spindle, of means subdividing the attachment into upper and lower gear compartments and an intermediate clutch compartment to provide dry operation of the clutch mechanism employed, means forming oil seals between said gear compartments and said clutch compartment, and the seal of said lower gear compartment having by-pass means adapted to conduct grease, leaking into said seal, away from said clutch compartment.

8. In a forward and reverse drive tapping attachment, a casing or housing structure comprising a main case part, upper and lower gear case parts detachable with the main part, a partitioning case part interposed between the upper portion of the main case part and said top gear case part to seal the chamber of the main case part from the chamber within the top gear case part, and means forming a seal between the chamber of the main case part and said bottom gear case part.

9. In a forward and reverse drive tapping attachment, a casing or housing structure comprising a main case part, upper and lower gear case parts detachable with the main part, a partitioning case part interposed between the upper portion of the main case part and the said top gear case part to seal the chamber of the main case part from the chamber within the top gear case part, means forming a seal between the chamber of the main case part and said bottom gear case part, means admitting lubricant into the chamber of the upper gear case part, and means for admitting lubricant into the chamber of the lower gear case part.

10. In a forward and reverse drive tapping attachment, a casing or housing structure comprising a main case part, upper and lower gear case parts detachable with the main part, a partitioning case part interposed between the upper portion of the main case part and said top gear case part to seal the chamber of the main case part from the chamber within the top gear case part, means forming a seal between the chamber of the main case part and said bottom gear case part, means admitting lubricant into the chamber of the upper gear case part, means for admitting lubricant into the chamber of the lower gear case part, and the main gear case part having an extension at one side with a vertical tubular portion therein to receive a shaft coupling the gears of the upper gear case part and the gears of the lower gear case part.

11. In a forward and reverse drive tapping attachment, a casing or housing structure comprising a main case part, upper and lower gear case parts detachable with the main part, a partitioning case part interposed between the upper portion of the main case part and said top gear case part to seal the chamber of the main case part from the chamber within the top gear case part, means forming a seal between the chamber of the main case part and said bottom gear case part, means admitting lubricant into the chamber of the upper gear case part, means for admitting lubricant into the chamber of the lower gear case part, the main gear case part having a series of circumferentially spaced air admission ports at the lower portion thereof opening into the chamber of the main case part, and a plurality of circumferential exhaust passages at the upper portion of the main case part for exhausting air from the chamber thereof.

12. In a tapping attachment of the class described, a central clutch housing, an upper gear chamber and a lower gear chamber, said gear chambers comprising casing parts independently detachable with respect to said clutch housing.

13. In a tapping attachment of the class described, a central clutch housing, an upper gear chamber and a lower gear chamber, said gear chambers comprising casing parts independently detachable with respect to said clutch housing, and means forming oil seals between said clutch housing and upper and lower gear chambers respectively.

GEORGE W. EMRICK.